US007088556B1

(12) United States Patent
Fu et al.

(10) Patent No.: US 7,088,556 B1
(45) Date of Patent: Aug. 8, 2006

(54) POSITIONER FOR A DISK DRIVE THAT OFFSETS THE RESULTANT FORCE AT THE ACTUATOR HUB TO PRECISELY POSITION A DATA TRANSDUCER

(75) Inventors: Yee-Chung Fu, Fremont, CA (US); Ken Chang, Saratoga, CA (US); Ross Pace, San Jose, CA (US)

(73) Assignee: Maxtor Corporation, Longmount, CO (US)

(*) Notice: Subject to any disclaimer, the term of this patent is extended or adjusted under 35 U.S.C. 154(b) by 213 days.

(21) Appl. No.: 10/611,419

(22) Filed: Jun. 30, 2003

(51) Int. Cl.
*G11B 21/08* (2006.01)
(52) U.S. Cl. .................................................. 360/264.7
(58) Field of Classification Search ............ 360/264.7, 360/264.8, 264.9, 265; 310/12, 15
See application file for complete search history.

(56) References Cited

U.S. PATENT DOCUMENTS

| 5,267,110 | A | | 11/1993 | Ottesen et al. |
| 5,295,031 | A | * | 3/1994 | Wasson ................... 360/264.9 |
| 5,621,591 | A | | 4/1997 | Rahimi et al. |
| 5,764,441 | A | * | 6/1998 | Aruga et al. ................ 360/265 |
| 6,104,581 | A | * | 8/2000 | Huang et al. ............ 360/264.7 |
| 6,225,712 | B1 | | 5/2001 | Miyamoto et al. ............ 310/15 |
| 6,710,981 | B1 | * | 3/2004 | Oveyssi et al. .......... 360/264.9 |
| 6,768,229 | B1 | * | 7/2004 | Rafaelof et al. ............... 310/12 |
| 6,768,614 | B1 | * | 7/2004 | Chang et al. ............ 360/264.7 |
| 2002/0097519 | A1 | * | 7/2002 | Chang et al. ............ 360/78.12 |
| 2002/0159196 | A1 | * | 10/2002 | Watanabe ................ 360/264.7 |

OTHER PUBLICATIONS

U.S. Appl. No. 10/263,222, filed Oct. 2, 2002, Wittig et al.

* cited by examiner

*Primary Examiner*—Tianjie Chen
(74) *Attorney, Agent, or Firm*—James P. Broder; Steven G. Roeder (57) ABSTRACT

A disk drive includes a storage disk, a data transducer, an actuator assembly and a positioner. The actuator assembly supports the data transducer over the storage disk. The actuator assembly includes a rotatable actuator hub and a longitudinal axis. The positioner moves the actuator assembly to position the data transducer relative to the storage disk. During movement of the actuator assembly, the actuator hub is subject to a resultant force that causes track misregistration of the data transducer. The positioner includes a magnet assembly that generates a magnetic field, a first conductor region and a second conductor region. In one embodiment, the conductor regions cooperate with the magnet assembly to generate a first force and a second force that are each directed at an angle having an absolute value that is greater than zero degrees and less than approximately 45 degrees relative to the longitudinal axis of the actuator assembly. In another embodiment, the conductor regions are each positioned at an angle having an absolute value of greater than approximately 45 degrees and less than 90 degrees relative to the longitudinal axis of the actuator assembly.

52 Claims, 6 Drawing Sheets

POSITIONER FOR A DISK DRIVE THAT OFFSETS THE RESULTANT FORCE AT THE ACTUATOR HUB TO PRECISELY POSITION A DATA TRANSDUCER

FIELD OF THE INVENTION

The present invention relates generally to a positioner for a disk drive that decreases track misregistration.

BACKGROUND

Disk drives are widely used in computers and data processing systems for storing information in digital form. These disk drives commonly use one or more rotating storage disks to store data in digital form. Each storage disk typically includes a data storage surface on each side of the storage disk. These storage surfaces are divided into a plurality of narrow, annular regions of different radii, commonly referred to as "tracks". The disk drive includes a head stack assembly having a positioner, an actuator assembly and one or more transducer assemblies. The actuator assembly includes an actuator hub, an actuator pivot center, and one or more actuator arms. Each transducer assembly includes one or more data transducers. The positioner is used to precisely rotate the actuator assembly to position the data transducers relative to one or more storage disks. The data transducer transfers information to and from the storage disk when precisely positioned over an appropriate data track (also referred to herein as a "target track") of the storage surface.

The need for increased storage capacity and compact construction of the disk drive has led to the use of disks having increased track density, i.e. more tracks per inch. As the track density increases, the ability to maintain the data transducer over the target track becomes more difficult. More specifically, as track density increases, it is necessary to reduce positioning error of the data transducer proportionally. With these systems, the accurate and stable positioning of the data transducer proximate the appropriate track is critical to the accurate transfer and/or retrieval of information from the rotating storage disks.

Conventional positioners which include the use of a voice coil motor are well known. The voice coil motor works by directing electrical current through a wound wire coil located in a magnetic field. Besides causing the actuator arms and transducer assemblies to move in a desired direction, the same coil forces excite one or more undesirable vibration modes, including for example, a "first vibration mode" and a "second vibration mode". In some drives, the first vibration mode can occur at a frequency of between approximately 5,000 and 7,500 cycles per second and the second vibration mode can occur at a frequency of between approximately 7,500 and 12,000 cycles per second, although these frequencies can vary depending upon the design of the disk drive. Either or both of these vibration modes can cause an undesirable resultant force (hereinafter "$F_R$") at the actuator hub, which when unaccounted for, can result in a vibration displacement of the data transducer. The vibration displacement of the data transducer can cause difficulty in accurately positioning and/or maintaining the positioning of the data transducer over the desired track of the storage disk. The first and/or second vibration modes are caused at least in part by the structural response of the actuator assembly to forces from the coil that are used to position the data transducers.

One attempt to increase the level of accuracy in positioning the actuator assembly and the transducer assembly relative to the storage disk includes using a so-called "pure torque" positioner, i.e. generating theoretical force vectors with one or more coils that are equal but directionally opposite relative to the actuator hub, so that the forces have a sum total of zero at the actuator hub. In theory, if the forces effectively offset each other, presumably no excitation of the first and second vibration modes at the actuator hub, and thus no resultant force $F_R$ at the actuator hub will occur. Importantly, however, this theory assumes that the positioner and the actuator assembly are a purely rigid, completely inflexible body, and the first and second vibration modes are rigid body translation motions. Unfortunately, because the positioner and the actuator assembly are not completely rigid, either or both of the first and/or second vibration modes are not satisfactorily inhibited and a resultant force $F_R$ on the actuator hub consequently remains.

In light of the above, the need exists to provide a high bandwidth positioner that accurately positions and/or maintains the position of one or more data transducer(s) relative to the target track. Another need exists to provide a positioner that inhibits excitation of the first and/or second vibration modes, and thus, the resultant force $F_R$ at the actuator hub. Still another need exists to reduce the cost of manufacturing a high performance, high-density disk drive.

SUMMARY

The present invention is directed to a disk drive that includes a storage disk, a data transducer, an actuator assembly and a positioner. The actuator assembly supports the data transducer over the storage disk. The actuator assembly includes a rotatable actuator hub and a longitudinal axis. The positioner moves the actuator assembly to position the data transducer relative to the storage disk. During movement of the actuator assembly, the actuator hub is subject to a resultant force that causes track misregistration of the data transducer. In one embodiment, the positioner includes a magnet assembly that generates a magnetic field, and a first conductor region. The first conductor region cooperates with the magnet assembly to generate a first force that is directed at an angle having an absolute value that is greater than zero degrees and less than approximately 45 degrees relative to the longitudinal axis of the actuator assembly. With this design, the positioner can at least partially offset the resultant force at the actuator assembly.

In another embodiment, the positioner includes a second conductor region that cooperates with the magnet assembly to generate a second force which is directed at an angle having an absolute value that is greater than zero degrees and less than approximately 45 degrees relative to the longitudinal axis of the actuator assembly. Moreover, the sum of the first force and the second force can be substantially equal to and directionally opposite the resultant force.

In one embodiment, the magnet assembly includes a first magnet and a second magnet. The first and second conductor regions can be positioned directly between the first and second magnets. The first magnet can have a first facing surface that faces a second facing surface of the second magnet. Further, the first magnet can includes a pair of outer regions each having a north pole on the first facing surface, connected by an inner region having a south pole on the first facing surface. The second magnet can include a pair of outer regions each having a south pole on the second facing surface, connected by an inner region having a north pole on the second facing surface. Further, the outer regions can have a magnet width that is greater than a magnet width of the inner regions.

Moreover, the first conductor region and the second conductor region can be part of a single coil. Alternatively, the conductor assembly can include a first coil that includes the first conductor region, and a spaced apart second coil that includes the second conductor region.

In an alternative embodiment, the first conductor region is positioned at an angle having an absolute value of greater than approximately 45 degrees and less than 90 degrees relative to the longitudinal axis of the actuator assembly. Further, the second conductor region can be positioned at an angle having an absolute value of greater than approximately 45 degrees and less than 90 degrees relative to the longitudinal axis of the actuator assembly.

The present invention is also directed toward a method for positioning a data transducer in a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
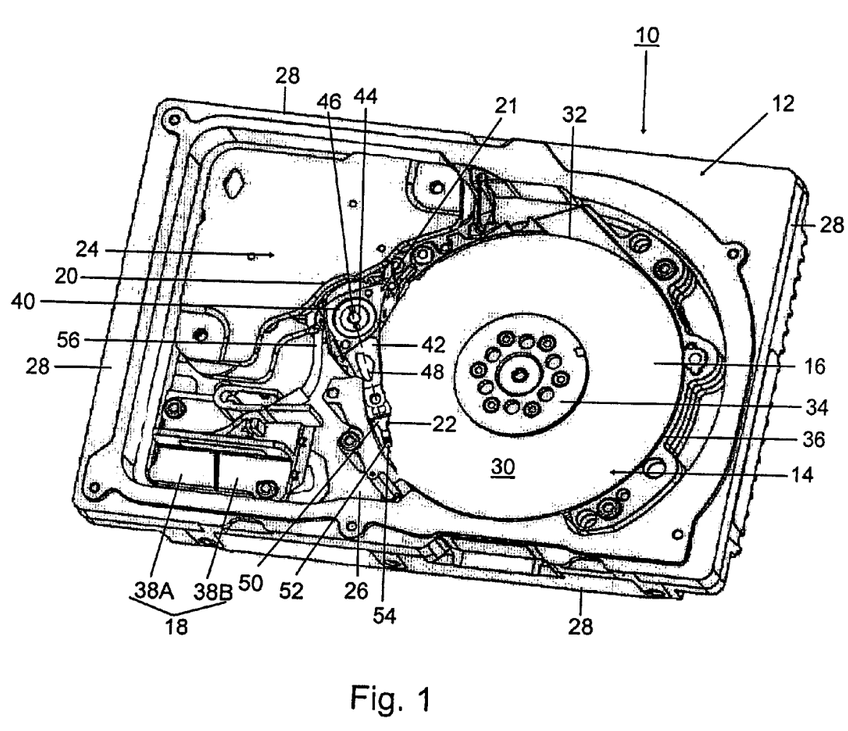
FIG. 1 is a perspective view of a disk drive having features of the present invention.

FIG. 1 illustrates a disk drive 10 according to the present invention. The disk drive 10 includes (i) a drive housing 12, (ii) a disk assembly 14 having one or more storage disks 16, (iii) a control system 18, and (iv) a head stack assembly 20 including an actuator assembly 21, one or more transducer assemblies 22 and a positioner 24 that precisely positions the actuator assembly 21, and thus the transducer assemblies 22, relative to the storage disk(s) 16. The drive housing 12 retains the various components of the disk drive 10. The drive housing 12 includes a base 26 and four side walls 28. A typical drive housing 12 also includes a cover (not shown for clarity) that is spaced apart from the base 26 by the side walls 28.

Each storage disk 16 includes one or more data storage surfaces 30. These storage surfaces 30 include a plurality of data tracks 32 (only one data track 32 is shown in FIG. 1). During track following, one of data tracks 32 is known as the target track 32, as illustrated for representational purposes on the top storage surface 30 of the uppermost storage disk 16. However, any of the data tracks 32 on the storage disks 16 can be the target track 32. Additionally, data is stored on the storage surface 30 between an inner diameter 34 and an outer diameter 36 of the storage disk 16.

The control system 18 directs current to the positioner 24 to move the actuator assembly 21 relative to the storage disks 16. The design of the control system 18 can vary depending upon the requirements of the positioner 24 and the particular disk drive 10. More specifically, the control system 18 can include a plurality of controllers. In the embodiment illustrated in FIG. 1, the control system 18 includes a first controller 38A and a second controller 38B. In one embodiment, each controller 38A, 38B can independently direct current to different regions of the positioner 24. In an alternative embodiment, each controller 38A, 38B can cooperate to direct current to one or more regions of the positioner 24. Still alternatively, the control system 18 can include greater or fewer than two controllers 38A, 38B.

The head stack assembly 20 includes the actuator assembly 21, one or more transducer assemblies 22, and the positioner 24. The actuator assembly 21 includes an actuator hub 40 and one or more actuator arms 42 (only one actuator arm 42 is shown for clarity). The actuator hub 40 rotates around an actuator shaft 44, which is secured to the base 26 and is positioned at an actuator pivot center 46. The actuator arms 42 are attached to and cantilever from the actuator hub 40.

The actuator assembly 21 has a longitudinal axis 48 (shown in phantom) that extends lengthwise along the actuator arms 42. The actuator arms 42 move with the actuator hub 40 and maintain the transducer assemblies 22 proximate the storage surfaces 30 of the storage disks 16. Regardless of the number of actuator arms 42 and transducer assemblies 22 in the head stack assembly 20, the actuator hub 40 and the actuator arm(s) 42 are collectively referred to herein as the actuator assembly 21.

The transducer assemblies 22 transfer information to and from the storage disks 16. In the embodiments illustrated herein, each transducer assembly 22 includes a load beam 50, a flexure 52, and a data transducer 54. The load beam 50 attaches the flexure 52 and the data transducer 54 to the actuator arm 42. Each flexure 52 is used to attach one of the data transducers 54 to one of the load beams 50. Each flexure 52 is subsequently attached to a flex circuit 56 that electrically couples the data transducers 54 to the control system 18. For a magnetic storage disk 16, the data transducer 54 can also be referred to as a read/write head.

Figure 2A:
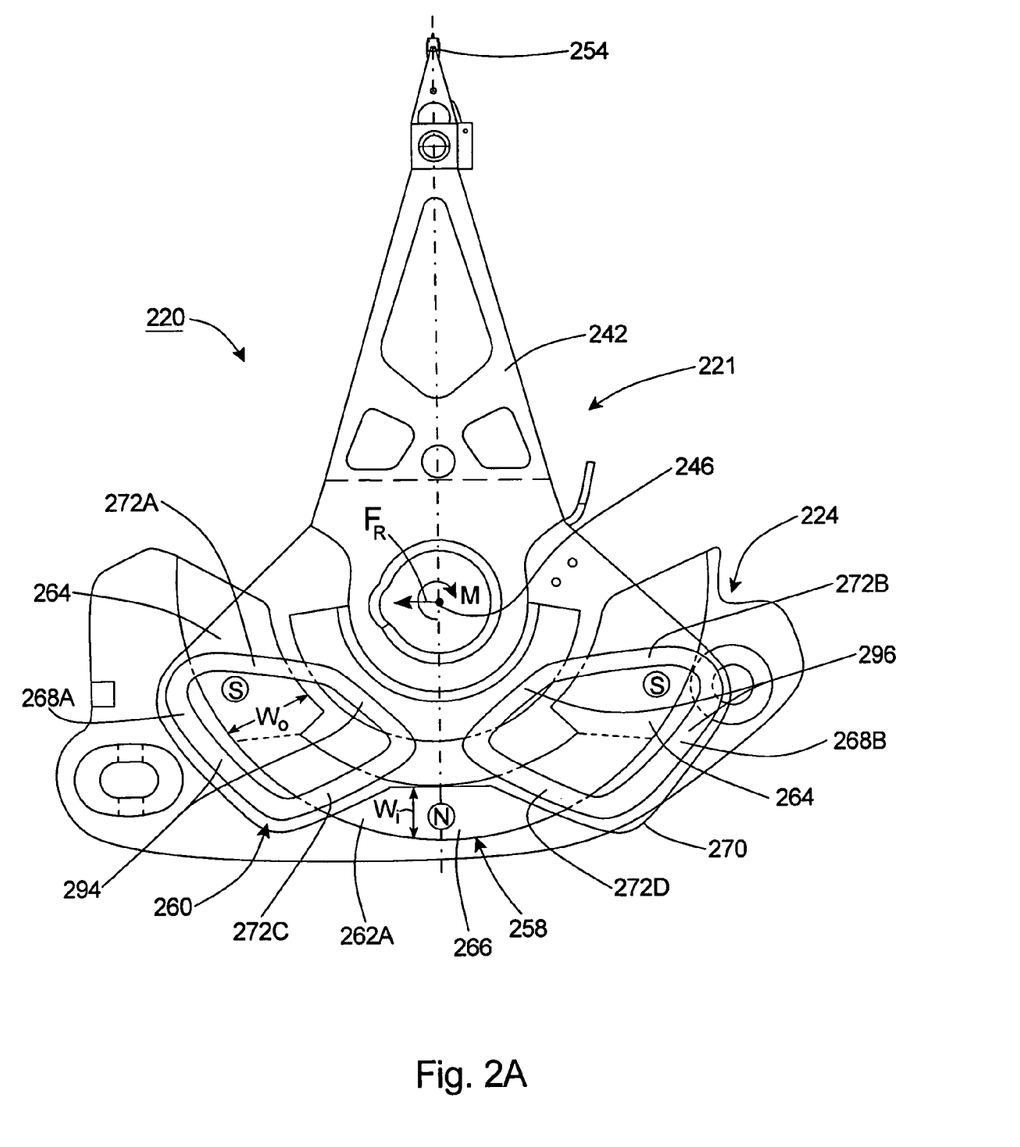
FIG. 2A is a top view of a portion of a head stack assembly including a portion of a first embodiment of a positioner having features of the present invention.

FIG. 2A illustrates a top view of the head stack assembly 220 including a first embodiment of the positioner 224. The positioner 224 provided herein positions the actuator assembly 221, and thus the data transducer 254, near the storage disk 16 (illustrated in FIG. 1) during reading and writing of data. The design of the positioner 224 can be varied in accordance with the requirements of the disk drive 10. In this embodiment, the positioner 224 includes a magnet assembly 258 (only partly shown in FIG. 2A) and a conductor assembly 260. As provided above, the positioner 224 positions and maintains the position of the data transducers 254 with improved accuracy, decreases the amplitude of the first and/or second vibration modes which reduces and/or cancels the resultant force $F_R$ at the actuator hub which is due to lack of complete rigidity of the actuator assembly 221, and allows for a higher servo bandwidth.

The magnet assembly 258 interacts with the conductor assembly 260 to position the actuator assembly 221, and thus the data transducers 254, relative to the storage disks 16. The design including the shape, size and positioning of the magnet assembly 258 can vary depending upon the requirements of the conductor assembly 260 and the disk drive 10.

Figure 2B:
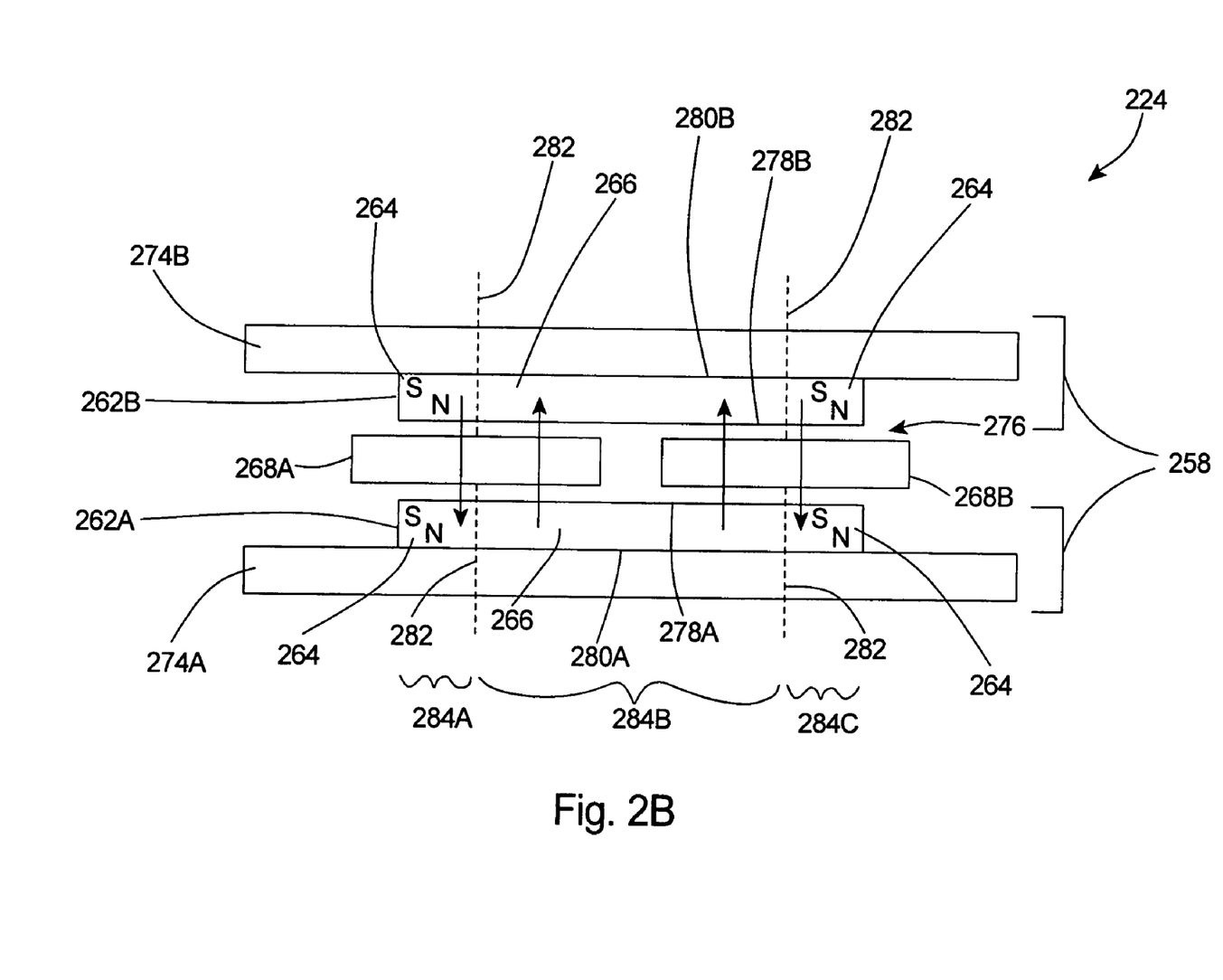
FIG. 2B is a partial end view of the positioner illustrated in FIG. 2A.

In the embodiment illustrated in FIG. 2A, the magnet assembly 258 includes a first magnet 262A and a second magnet 262B (illustrated in FIG. 2B for clarity). Each magnet 262A, 262B can include a pair of spaced apart outer regions 264 connected by an inner region 266. In the embodiment illustrated in FIG. 2A, at least one of the outer regions 264 of the first magnet 262A has an outer region width $W_o$ that is greater than an inner region width $W_i$ of the inner region 266. Although not illustrated in FIG. 2A, the second magnet 262B can be similarly configured as the first magnet 262A. Alternatively, the magnets 262A, 262B can have different configurations. For example, one or more of the outer region widths $W_o$ can be smaller than or the same as the inner region width $W_i$.

Still alternatively, the thickness of the magnets 262A, 262B can be different at the outer regions 264 than the inner region 266. For example, the thickness of the outer regions 264 can be greater than the thickness of the inner region 266.

In one embodiment, the inner regions 266 and the outer regions 264 of each magnet 262A, 262B, are generally arcuate in shape. For example, the inner regions 266 and/or the outer regions 264 can form arcs of concentric circles, the center of which is located approximately at the actuator pivot center 246.

The conductor assembly 260 includes one or more coils and a conductor housing 270. In the embodiment illustrated in FIG. 2A, the conductor assembly 260 includes a first coil 268A and a second coil 268B that are secured to the conductor housing 270. Each coil 268A, 268B includes a wire (not shown) that is wrapped into a plurality of turns. The configuration of each coil 268A, 268B can vary depending upon the requirements of the positioner 224 and the disk drive 10.

The conductor housing 270 can be a separate component from the actuator assembly 221 or the conductor housing 270 can be formed as a unitary part of the actuator assembly 221. The conductor housing 270 can be formed from materials such as plastic, metal or other suitable substantially rigid materials, for example.

The control system 18 (illustrated in FIG. 1) directs current to electrically excite the coils 268A, 268B of the conductor assembly 260, and move the conductor assembly 260 relative to the magnet assembly 258 thereby rotating the actuator assembly 221, which moves the data transducer 254 relative to the storage disk 16. The resultant magnetic fields (illustrated as arrows in FIG. 2B) of the magnet assembly 258 are such that current passing through the conductor assembly 260 in one direction causes movement of the conductor assembly 260 in one direction and rotation of the actuator arms 242 in one radial direction relative to the storage disks 16 (such as a radially outward direction) while reverse current causes reverse direction movement (such as a radially inward direction).

In the embodiment illustrated in FIG. 2A, the first coil 268A includes a first conductor region 272A, a third conductor region 272C and a pair of first connector regions 294. Each of the first connector regions 294 connects the first conductor region 272A to the third conductor region 272C. The second coil 268B includes a second conductor region 272B, a fourth conductor region 272D and a pair of second connector regions 296. Each of the second connector regions 296 connects the second conductor region 272B to the fourth conductor region 272D.

Each conductor region 272A–D is substantially positioned between the magnets 262A, 262B, and interacts with the magnetic field generated by the magnet assembly 258 to generate a force that moves the conductor assembly 260 relative to the magnet assembly 258, as described in greater detail below. In this embodiment, the first and second conductor regions 272A, 272B are positioned in a fluid gap 274 (illustrated in FIG. 2B) between the outer regions 264 of the magnets 262A, 262B, which have a greater outer region width $W_o$ than the inner region width $W_i$ of each magnet 262A, 262B.

The third and fourth conductor regions 272C, 272D are positioned in the fluid gap 274 between the narrower inner regions 266 of the magnets 262A, 262B. In this embodiment, only the first, second, third and fourth conductor regions 272A–D of the first and second coils 268A, 268B, are positioned directly between the magnets 262A, 262B. In contrast, the first and second connector regions 294, 296 of each of the respective coils are not positioned directly between the magnets 262A, 262B, and are therefore effectively positioned outside of the influence of the magnetic field. Moreover, as illustrated in FIG. 2A, the first and second conductor regions 272A, 272B are positioned within a magnetic field that is substantially the opposite of the magnetic field within which the third and fourth conductor regions 272C, 272D are positioned.

Further, because the third and fourth conductor regions 272C, 272D are positioned between the narrower inner regions 266 of the magnets 262A, 262B, a lesser force is generated from the third and fourth conductor regions 272C, 272D than from the first and second conductor regions 272A, 272B, as explained below. The third and fourth conductor regions 272C, 272D can provide the positioner 224 with additional force to rotate the actuator assembly 221 relative to the storage disks 16. Alternatively, the positioning of the conductor regions 272A-D and the configuration of the magnets 262A, 262B can be such that a greater or equal force is generated from the third and fourth conductor regions 272A, 272B relative to the first and second conductor regions 272A, 272B.

FIG. 2B illustrates an end view of a portion of the positioner 224 illustrated in FIG. 2A, including the magnet assembly 258, the first coil 268A and the second coil 268B. The conductor housing 270 has been omitted for clarity. The magnet assembly 258 includes the magnets 262A, 262B, a first flux return plate 274A and a second flux return plate 274B. The first magnet 262A and the second magnet 262B are spaced apart by a fluid gap 276.

The first magnet 262A includes a substantially flat, first facing surface 278A, a spaced apart and a substantially flat, first opposing surface 280A. The second magnet 262B can have a substantially flat, second facing surface 278B, and a spaced apart and a substantially flat, second opposing surface 280B. As illustrated in FIG. 2B, the facing surfaces 278A, 278B generally face each other.

Alternatively, each magnet 262A, 262B can be sized and shaped in another suitable configuration. The shape, size and positioning of each magnet 262A, 262B, can vary depending upon the configuration of the conductor assembly 260 and the requirements of the disk drive 10. In this embodiment, the first and second magnets 262A, 262B, are positioned in substantially parallel planes.

FIG. 2B also illustrates one or more transition zones 282 that vertically divide each magnet 262A, 262B, into one or more magnet sectors. The transition zones 282 (represented by dashed lines) separate the magnet assembly 258 into a first magnet sector 284A, a second magnet sector 284B and a third magnet sector 284C. The magnet sectors 284A–C illustrated in FIG. 2B generally correspond to the inner regions 266 and the outer regions 264 of each magnet 262A, 262B. Each of the magnet sectors 284A–C has at least one north pole (indicated by an "N") and at least one south pole (indicated by an "S") on the facing surfaces 278A, 278B of the magnets 262A, 262B. The poles of the magnet sectors 284A–C for the first facing surface 278A are inverted relative to the corresponding magnet sectors 284A–C for the second facing surface 278B. With this design, the magnetic fields (represented as arrows on FIG. 2B) for each of the magnet sectors 284A–C, of the magnets 262A, 262B, depend upon the orientation of the poles. For example, the magnetic fields for the first magnet sector 284A and the third magnet sector 284C are directionally opposite from the magnetic field for the second magnet sector 284B of the magnets 262A, 262B.

The flux return plates 274A, 274B serve as a return path for magnetic fields from the magnets 262A, 262B. The design of the flux return plates 274A, 274B can vary depending upon the requirements of the positioner 224 and the disk drive 10. Each flux return plate 274A, 274B can be made of a magnetically permeable material such as a soft iron or steel. In this embodiment, the flux return plates 274A, 274B are secured to the drive housing 12 (illustrated in FIG. 1). Further, in those embodiments with two magnets 262A, 262B, the first magnet 262A can be secured to the first return plate 274A and the second magnet 262B can be secured to the second return plate 274B. Either flux return plate 274A, 274B can be the first flux return plate 274A or the second flux return plate 274B.

Figure 2C:
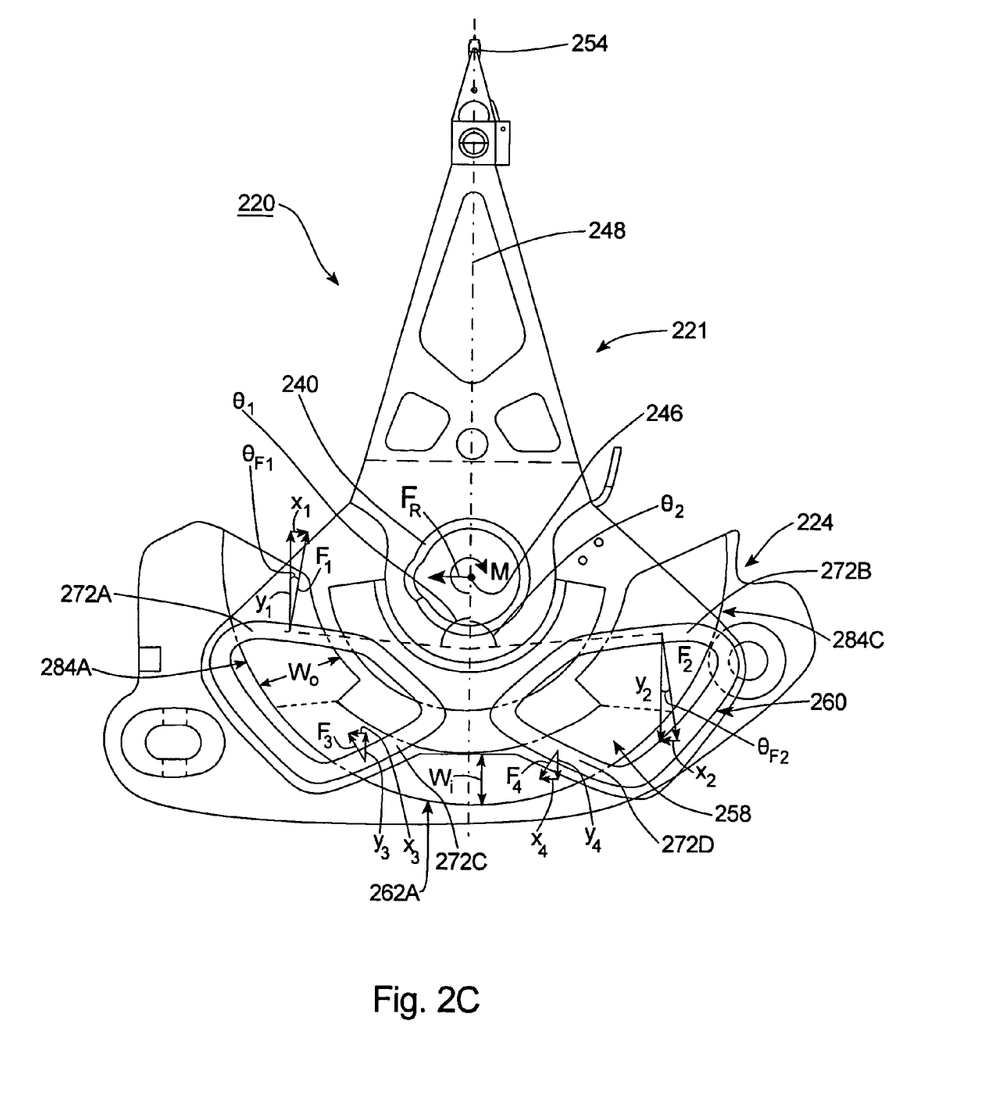
FIG. 2C is a top view of a portion of the head stack assembly illustrated in FIG. 2A, including a force diagram.

FIG. 2C is a force diagram of the head stack assembly illustrated in FIG. 2A. The control system 18 (illustrated in FIG. 1) can direct current to the conductor assembly 260 so that the electrically excited first conductor region 272A generates a first force, $F_1$, and the electrically excited second conductor region 272B generates a second force, $F_2$, as illustrated on FIG. 2C. The current directed to each coil 268A, 268B can be the same, or it can differ. Further, the current directed to each coil 268A, 268B can be in the same direction, or in opposite directions depending upon the design of the positioner 224 and the orientation of the magnet assembly 258. The magnitude of force $F_1$ can be substantially equal to the magnitude of force $F_2$. However, in this embodiment, the directions of forces $F_1$, $F_2$ differ. Alternatively, the magnitude of the forces $F_1$, $F_2$ can differ.

More specifically on FIG. 2C, the first conductor region 272A is immersed in magnetic fields within the first magnet sector 284A of the magnets 262A, 262B (only the first magnet 262A is shown in FIG. 2C for clarity), while the second conductor region 272B is immersed in magnetic fields within the third magnet sector 284C of the magnets 262A, 262B.

In the embodiment illustrated in FIG. 2C, force $F_1$ is comprised of two force vectors, $X_1$ and $Y_1$. Somewhat similarly, force $F_2$ is comprised of two force vectors, $X_2$ and $Y_2$. Vectors $X_1$ and $X_2$ are oriented substantially perpendicular to the longitudinal axis 248 of the actuator assembly 221, while vectors $Y_1$ and $Y_2$ are oriented substantially parallel to the longitudinal axis 248 of the actuator assembly 221. In one embodiment, vectors $Y_1$ and $Y_2$ can be substantially equal in magnitude, but directionally opposite. Vectors $Y_1$ and $Y_2$ can at least partially provide torque at the actuator pivot center 246 to rotate the actuator assembly 221, and thus the data transducers 254, relative to the storage disks 16 (illustrated in FIG. 1). Further, in this embodiment, vectors $X_1$ and $X_2$ can be substantially equal in both magnitude and direction.

In this embodiment, the third conductor region 272C generates a force $F_3$, which is preferably substantially equal in magnitude and directionally opposite a force $F_4$ which is generated by the fourth conductor region 272D. The magnitude of forces $F_3$ and $F_4$ can be substantially less than the magnitude of forces $F_1$ and $F_2$ due to the decreased influence of the magnetic field at the inner region 266 of the magnet assembly 258.

In the embodiment illustrated in FIG. 2C, force $F_3$ is comprised of two force vectors, $X_3$ and $Y_3$. Somewhat similarly, force $F_4$ is comprised of two force vectors, $X_4$ and $Y_4$. In this embodiment, vectors $X_3$ and $X_4$ are oriented substantially perpendicular to the longitudinal axis 248 of the actuator assembly 221, while vectors $Y_3$ and $Y_4$ are oriented substantially parallel to the longitudinal axis 248 of the actuator assembly 221. In one embodiment, vectors $Y_3$ and $Y_4$ can be substantially equal in magnitude, but directionally opposite. Vectors $Y_3$ and $Y_4$ can at least partially provide torque at the actuator pivot center 246 to rotate the actuator assembly 221, and thus the data transducers 254, relative to the storage disks 16 (illustrated in FIG. 1). Further, in this embodiment, vectors $X_3$ and $X_4$ can be substantially equal in both magnitude and direction.

In this embodiment, the sum of vectors $Y_1+Y_2+Y_3+Y_4 \approx 0$. Thus, the sum total of forces $F_1+F_2+F_3+F_4 \approx X_1+X_2+X_3+X_4$. In this example, the size, shape and/or positioning of the coils 268A, 268B relative to the magnet assembly 258 is designed so that the sum total of $F_1+F_2+F_3+F_4$ (and thus $X_1+X_2+X_3+X_4$) is approximately equal in magnitude, and opposite in direction to the resultant force $F_R$, resulting in a net force $F_N$ at the actuator hub 240 of approximately zero. In other words, $F_1+F_2+F_3+F_4+F_R \approx 0$.

In alternative embodiments, the size, shape and/or positioning of the coils 268A, 268B relative to the magnet assembly 258 can result in a sum total of forces $F_1+F_2+F_3+F_4$ that offset the resultant force FR at the actuator hub 240 by least approximately 10%, 20%, 30%, 40%, 50%, 60%, 70%, 80% or 90%. Stated another way, the size, shape and/or positioning of the coils 268A, 268B relative to the magnet assembly 258 can result in a net force $F_N$ at the actuator hub 240 that is approximately 90%, 80%, 70%, 60%, 50%, 40%, 30%, 20% or 10%, respectively, of the resultant force $F_R$ at the actuator hub 240. As a consequence, excitation of the first and/or second vibration modes would be inhibited, offsetting and/or canceling the resultant force $F_R$ at the actuator hub 240 causing less wear and/or longer life of the actuator assembly 221, and a decreased likelihood of track misregistration. Further, the accuracy with which the positioner 224 positions the data transducer 254 is increased. Accordingly, track density can be increased, thereby augmenting the capacity and performance of the disk drive 10.

Because the inner region width $W_i$ is smaller than the outer region width $W_o$, the strength of the magnetic field is decreased at the second magnet sector 284B of the magnets 262A, 262B. Thus, forces $F_3$ and $F_4$ can be substantially less than forces $F_1$ and $F_2$, e.g., $F_1+F_2>F_3+F_4$, which can permit fine adjustment of the torque at the actuator pivot center 246 by configuring the ratios of the outer region widths $W_o$ to the inner region width $W_i$, or by providing disparate strengths of the magnets in the outer regions 264 relative to the inner region 266. Further, the lengths of the conductor regions 272A–D can be varied to provide fine-tuning capabilities to the positioner 224.

The present invention compensates for the inherent lack of complete rigidity in the head stack assembly 220. In particular, referring to FIG. 2C, the conductor assembly 260 is coupled to the actuator assembly 221 with (i) the first conductor region 272A positioned at a first region angle $\theta_1$ relative to the longitudinal axis 248 of the actuator assembly 221, and (ii) the second conductor region 272B positioned at a second region angle $\theta 2$ relative to the longitudinal axis 248 of the actuator assembly 221. As referred to herein, the region angles $\theta_1$ and $\theta_2$ are measured in terms of their absolute values relative to the longitudinal axis 248. The region angles $\theta_1$ and $\theta_2$ can vary depending upon the size and shape of the conductor assembly 260 and the requirements of the head stack assembly 220.

For example, region angles $\theta_1$ and $\theta_2$ can have absolute values of less than approximately 90 degrees relative to the longitudinal axis 248 of the actuator assembly 221. Alternatively, region angles $\theta_1$ and $\theta_2$ can have absolute values within the range of between approximately 45 degrees and 89 degrees. Still alternatively, region angles $\theta_1$ and $\theta_2$ can have absolute values within the range of between approximately 60 degrees and 88 degrees. In another alternative embodiment, region angles $\theta_1$ and $\theta_2$ can have absolute values within the range of between approximately 70 degrees and 85 degrees. In yet another alternative embodiment, region angles $\theta_1$ and $\theta_2$ can have absolute values outside the foregoing ranges. As illustrated in FIG. 2C, the absolute values of $\theta_1$ and $\theta_2$ are approximately equal to each other. Alternatively, $\theta_1$ and $\theta_2$ can differ from one another depending upon the requirements of the head stack assembly 220 and/or the actuator assembly 221.

Additionally, each force $F_1$, $F_2$ has a corresponding force angle $\theta_{F1}$, $\theta_{F2}$, which is determined by the approximate direction of each force $F_1$, $F_2$ relative to the longitudinal axis 248 of the actuator assembly 221. The corresponding force angles $\theta_{F1}$, $\theta_{F2}$, of the forces $F_1$ and $F_2$ are approximately equal to the complement of the corresponding region angles $\theta_1$, $\theta_2$. For example, assuming a first region angle $\theta_1$ having an absolute value of 89 degrees, a first force angle $\theta_{F1}$ would have an absolute value of approximately 1 degree. In another example, assuming a second region angle $\theta_2$ having an absolute value of 86 degrees, a first force angle $\theta_{F1}$ would have an absolute value of approximately 4 degrees.

Figure 3:
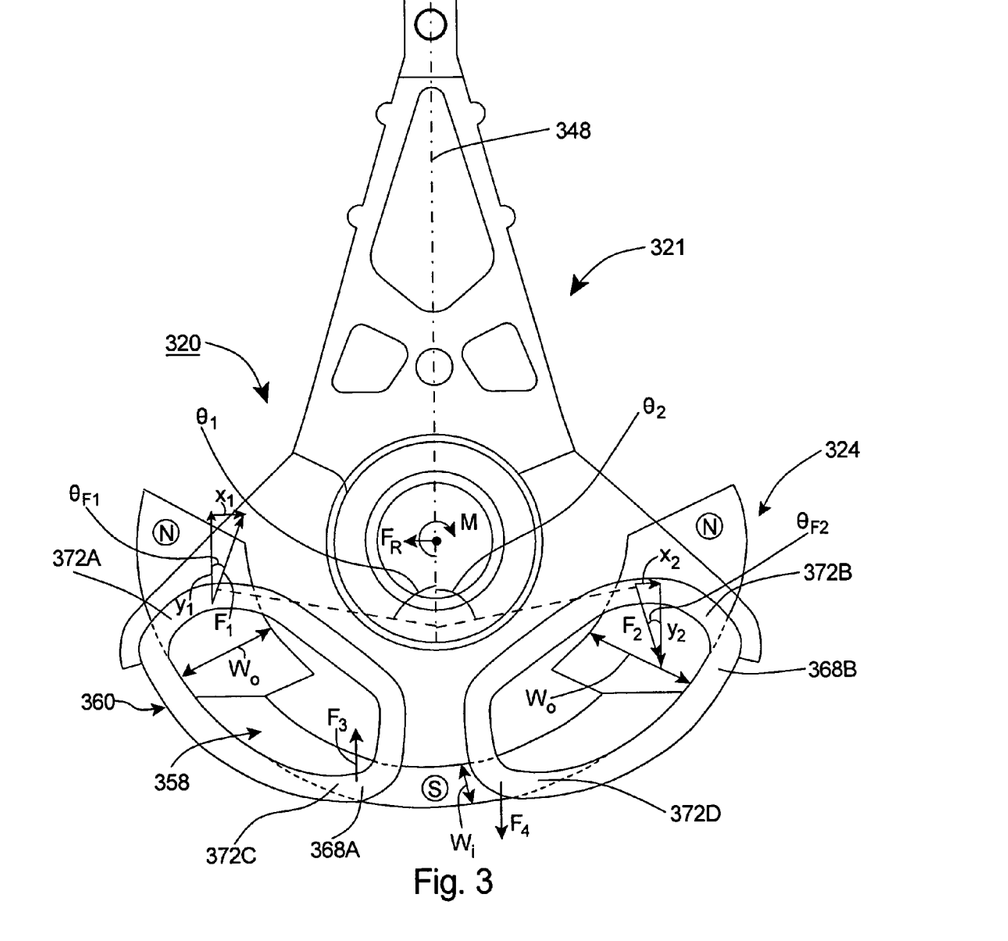
FIG. 3 is a top view of a portion of a head stack assembly including a portion of a second embodiment of a positioner having features of the present invention.

FIG. 3 illustrates a second embodiment of the positioner 324, including a conductor assembly 360 and a magnet assembly 358. In this embodiment, the conductor assembly 360 includes a first coil 368A and a second coil 368B, which are generally somewhat oval-shaped. The shape of the coils 368A, 368B, can vary, however.

In the embodiment illustrated in FIG. 3, the forces generated by the first and second conductor regions 372A, 372B are somewhat similar to those previously described. In this embodiment, the third conductor region 372C generates a force $F_3$, which is preferably substantially equal in magnitude and directionally opposite a force $F_4$ which is generated by the fourth conductor region 372D. In one embodiment, forces $F_3$ and $F_4$ can be substantially parallel to the longitudinal axis 348 of the actuator assembly 321. With this design, forces $F_3$ and $F_4$ each only have a vector in the y-direction, which assists in providing torque to rotate the actuator assembly 321. However, because of the lack of complete rigidity of the head stack assembly 320, forces $F_3$ and $F_4$ could potentially excite the first and/or second vibration modes, and thus increase the resultant force FR at the actuator hub. In this embodiment, however, the region angles $\theta_1$, $\theta_2$ can be modified to take into account potential excitation of the first and/or second vibration modes by forces $F_3$ and $F_4$. Alternatively, the third and fourth conductor regions 372C, 372D can be positioned so that forces $F_3$ and $F_4$ and corresponding force angles $\theta_{F1}$, $\theta_{F2}$ are angled relative to the longitudinal axis 348 of the actuator assembly 321.

Figure 4:
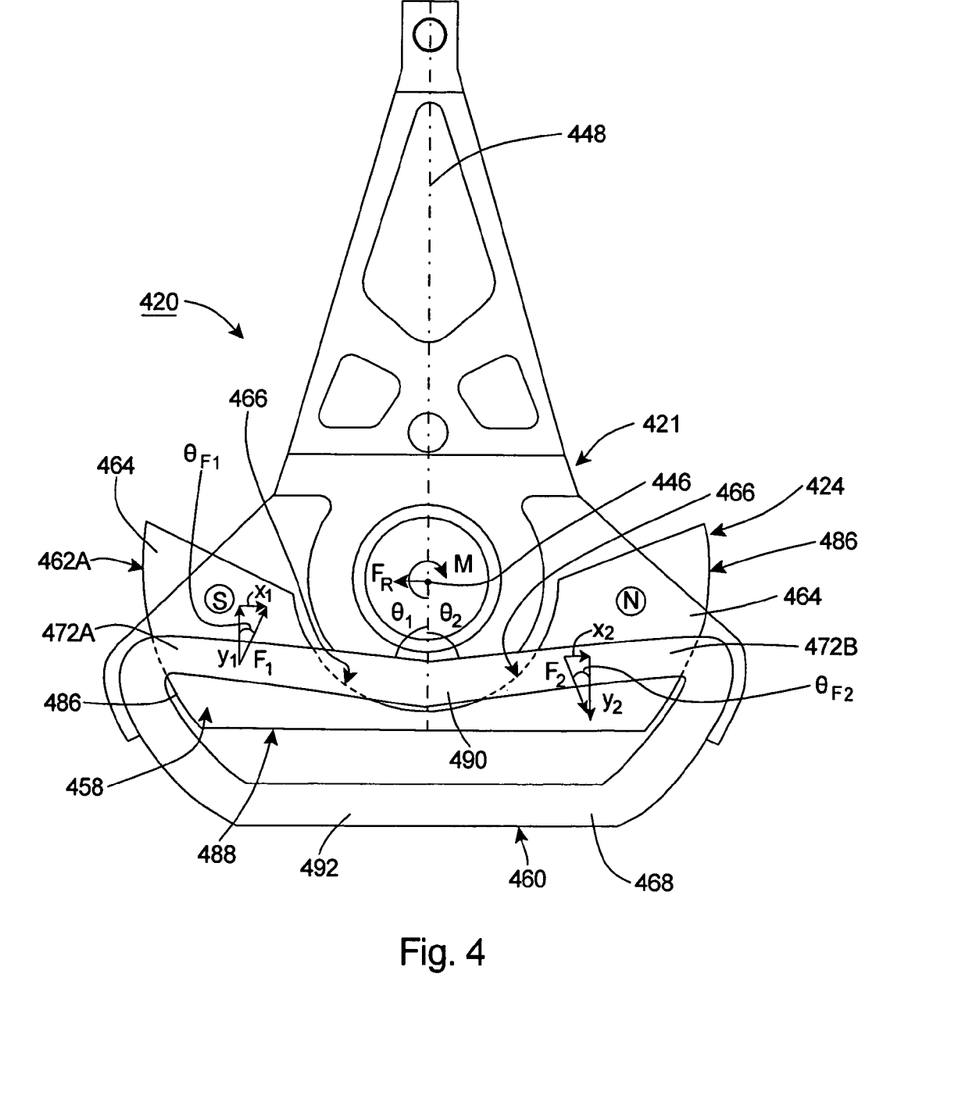
FIG. 4 is a top view of a portion of a head stack assembly including a portion of a third embodiment of a positioner having features of the present invention.

FIG. 4 illustrates another embodiment of the head stack assembly 420 including a positioner 424. In this embodiment, the first magnet 462A and the second magnet (only the first magnet 462A is illustrated in FIG. 4 for clarity), has two outer regions 464 and no inner region. Further, the outer regions 464 can be mirror images of each other, as illustrated in FIG. 4. Alternatively, the outer regions 464 can have differing configurations.

Each outer region 464 in this embodiment has an outer arc 486 and an outer side 488. The outer arcs 486 can form an arc of a circle that have a center located approximately at the actuator pivot center 446. The outer side 488 can vary in shape, size and positioning. The outer side 488 can be substantially linear as shown in FIG. 4, or can have another suitable configuration such as a curved shape.

In the embodiment shown in FIG. 4, the conductor assembly 460 includes only a first coil 468. In this embodiment, the first coil 468 includes a first conductor region 472A, a second conductor region 472B, a center conductor region 490, and an outer conductor region 492.

The first conductor region 472A and the second conductor region 472B are typically positioned between the magnets. As a result, only the first conductor region 472A and the second conductor region 472B effectively interact with the magnetic fields when the coil 468 is energized. More specifically, in one embodiment, the first conductor region 472A is positioned directly between and is bounded by the inner regions 466 of the magnets, and the outer arcs 486 of the magnets. In this embodiment, the second conductor region 472B is positioned directly between and is bounded by the arc-shaped inner regions 466 of the magnets, and the outer arcs 486 of the magnets. Moreover, the first conductor region 472A and the second conductor region 472B can be positioned symmetrically about the longitudinal axis 448 of the actuator assembly 421.

On the other hand, the center conductor region 490 is typically not positioned directly between the magnets. Thus, in the embodiment illustrated in FIG. 4, the center conductor region 490 is positioned substantially outside of the influence of the magnetic fields of the magnet assembly 458. Moreover, the outer conductor region 492 illustrated in FIG. 4 is also positioned effectively outside of the influence of the magnetic fields of the magnet assembly 458.

In this embodiment, the conductor assembly 460 is coupled to the actuator assembly 421 with (i) the first conductor region 472A positioned at a first region angle $\theta_1$ relative to the longitudinal axis 448 of the actuator assembly 421, and (ii) the second conductor region 472B positioned at a second region angle $\theta_2$ relative to the longitudinal axis 448 of the actuator assembly 421. As referred to herein, the region angles $\theta_1$ and $\theta_2$ are measured in terms of their absolute values relative to the longitudinal axis 448. The region angles $\theta_1$ and $\theta_2$ can vary depending upon the size and shape of the conductor assembly 460 and the requirements of the head stack assembly 420.

For example, region angles $\theta_1$ and $\theta_2$ can have absolute values of less than approximately ninety degrees relative to the longitudinal axis 448 of the actuator assembly 421. Alternatively, region angles $\theta_1$ and $\theta_2$ can have absolute values within the range of between approximately 45 degrees and 89 degrees. Still alternatively, region angles $\theta_1$ and $\theta_2$ can have absolute values within the range of between approximately 60 degrees and 88 degrees. In another alternative embodiment, region angles $\theta_1$ and $\theta_2$ can have absolute values within the range of between approximately 70 degrees and 85 degrees. In yet another embodiment, the region angles $\theta_1$ and $\theta_2$ are outside of the foregoing ranges. As illustrated in FIGS. 4, $\theta_1$ and $\theta_2$ are approximately equal to each other. Alternatively, $\theta_1$ and $\theta_2$ can differ from one another depending upon the requirements of the head stack assembly 420 and/or the actuator assembly 421.

In the embodiment illustrated in FIG. 4, force $F_1$ is comprised of two force vectors, $X_1$ and $Y_1$. Somewhat similarly, force $F_2$ is comprised of two force vectors, $X_2$ and $Y_2$. Vectors $X_1$ and $X_2$ are oriented substantially perpendicular to the longitudinal axis 448 of the actuator assembly 421, while vectors $Y_1$ and $Y_2$ are oriented substantially parallel to the longitudinal axis 448 of the actuator assembly 421. In one embodiment, vectors $Y_1$ and $Y_2$ can be substantially equal in magnitude, but directionally opposite. Vectors $Y_1$ and $Y_2$ provide torque at the actuator pivot center 446 to rotate the actuator assembly 421, and thus the data transducers (not shown in FIG. 4), relative to the storage disks 16 (illustrated in FIG. 1). Further, in this embodiment, vectors $X_1$ and $X_2$ can be substantially equal in both magnitude and direction.

Additionally, each force $F_1$, $F_2$ has a corresponding force angle $\theta_{F1}$, $\theta_{F2}$, which is the approximate direction of each force $F_1$, $F_2$. The corresponding force angles of the forces $F_1$ and $F_2$ are approximately equal to the complement of the corresponding region angles $\theta_1$, $\theta_2$. For example, assuming a first region angle $\theta_1$ having an absolute value of 89 degrees, a first force angle $\theta_{F1}$ would have an absolute value of approximately 1 degree. In another example, assuming a second region angle $\theta_2$ having an absolute value of 86 degrees, a first force angle $\theta_{F1}$ would have an absolute value of approximately 4 degrees.

While the particular positioner 24 and disk drive 10 as herein shown and disclosed in detail is fully capable of attaining the objectives and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
a storage disk having a plurality of tracks;
a data transducer;
an actuator assembly that supports the data transducer over one of the tracks, the actuator assembly having a rotatable actuator hub and a longitudinal axis, the actuator hub being subjected to a resultant force caused at least partially by a lack of complete rigidity of portions of the disk drive, the resultant force urging the data transducer in an off-track direction; and
a positioner that moves the actuator assembly relative to the storage disk, the positioner including (i) a magnet assembly that generates a magnetic field, and (ii) a conductor assembly that cooperates with the magnet assembly to rotate the actuator hub and to generate a net force in a direction that is substantially opposite the resultant force.

2. The disk drive of claim 1 wherein the conductor assembly includes a first coil that generates a first force that is directed at an angle having an absolute value that is greater than zero degrees and less than approximately 45 degrees relative to the longitudinal axis of the actuator assembly.

3. The disk drive of claim 2 wherein the conductor assembly includes a spaced apart second coil that generates a second force that is directed at an angle having an absolute value that is greater than zero degrees and less than approximately 45 degrees relative to the longitudinal axis of the actuator assembly.

4. The disk drive of claim 3 wherein the sum of the first force and the second force equals the net force of the conductor assembly.

5. The disk drive of claim 4 wherein the net force is substantially equal to and substantially opposite the resultant force.

6. The disk drive of claim 3 wherein the first coil and the second coil are substantially symmetrical relative to the longitudinal axis of the actuator assembly.

7. The disk drive of claim 3 wherein the first force is directed at an angle having an absolute value that is greater than one degree and less than approximately 30 degrees relative to the longitudinal axis of the actuator assembly, and the second force is directed at an angle having an absolute value that is greater than one degree and less than approximately 30 degrees relative to the longitudinal axis of the actuator assembly.

8. The disk drive of claim 3 further comprising a control system that independently directs electrical current to each of the coils.

9. The disk drive of claim 3 wherein the first coil and the second coil are substantially coplanar.

10. The disk drive of claim 1 wherein the net force has a magnitude that is substantially equal to and directionally opposite the resultant force.

11. A disk drive comprising:
a storage disk having a plurality of tracks;
a data transducer;
an actuator assembly that supports the data transducer over one of the tracks, the actuator assembly having a rotatable actuator hub and a longitudinal axis, the actuator hub being subjected to a resultant force caused at least partially by a lack of complete rigidity of portions of the disk drive, the resultant force being in a direction that is substantially perpendicular to the longitudinal axis; and
a positioner that moves the actuator assembly relative to the storage disk, the positioner including (i) a magnet assembly that generates a magnetic field, and (ii) a conductor assembly that cooperates with the magnet assembly to generate a net force in a direction that is substantially opposite the resultant force to at least partially cancel the resultant force.

12. The disk drive of claim 11 wherein the conductor assembly includes a first coil that generates a first force that is directed at an angle having an absolute value that is greater than zero degrees and less than approximately 45 degrees relative to the longitudinal axis of the actuator assembly.

13. The disk drive of claim 12 wherein the conductor assembly includes a spaced apart second coil that generates a second force that is directed at an angle having an absolute value that is greater than zero degrees and less than approximately 45 degrees relative to the longitudinal axis of the actuator assembly.

14. The disk drive of claim 13 wherein the sum of the first force and the second force equals the net force of the conductor assembly.

15. The disk drive of claim 14 wherein the net force is substantially equal to and substantially opposite the resultant force.

16. The disk drive of claim 13 wherein the first coil and the second coil are substantially symmetrical relative to the longitudinal axis of the actuator assembly.

17. The disk drive of claim 13 wherein the first force is directed at an angle having an absolute value that is greater than one degree and less than approximately 30 degrees relative to the longitudinal axis of the actuator assembly, and the second force is directed at an angle having an absolute value that is greater than one degree and less than approximately 30 degrees relative to the longitudinal axis of the actuator assembly.

18. The disk drive of claim 13 further comprising a control system that independently directs electrical current to each of the coils.

19. The disk drive of claim 13 wherein the first coil and the second coil are substantially coplanar.

20. The disk drive of claim 11 wherein the net force has a magnitude that is substantially equal to and directionally opposite the resultant force.

21. The disk drive of claim 11 wherein the magnet assembly cooperates with the conductor assembly to rotate the actuator hub to position the data transducer relative to the storage disk.

22. A method for positioning a data transducer in a disk drive, the method comprising the steps of:
supporting the data transducer with an actuator assembly having a rotatable actuator hub and a longitudinal axis, the actuator hub being subjected to a resultant force caused at least partially by a lack of complete rigidity of portions of the disk drive, the resultant force urging the data transducer in an off-track direction;
positioning the actuator assembly by rotating the actuator hub with a positioner that includes (i) a magnet assembly that generates a magnetic field, and (ii) a conductor assembly that cooperates with the magnet assembly; and
generating a net force with the positioner, the net force being in a direction that is substantially opposite the resultant force.

23. The method of claim 22 wherein the step of generating a net force includes generating a first force with a first coil, the first force being directed at an angle having an absolute value that is greater than zero degrees and less than approximately 45 degrees relative to the longitudinal axis of the actuator assembly.

24. The method of claim 23 wherein the step of generating a net force includes generating a second force with a spaced apart second coil, the second force being directed at an angle having an absolute value that is greater than zero degrees and less than approximately 45 degrees relative to the longitudinal axis of the actuator assembly.

25. The method of claim 24 wherein the sum of the first force and the second force equals the net force of the conductor assembly.

26. The method of claim 24 further comprising the step of independently directing electrical current to each of the coils with a control system.

27. The method of claim 24 wherein the step of generating the net force includes positioning the first coil and the second coil substantially symmetrically on either side of the longitudinal axis of the actuator assembly.

28. The method of claim 22 wherein the net force is substantially equal to and directionally opposite the resultant force.

29. A method for positioning a data transducer in a disk drive, the method comprising the steps of:
supporting the data transducer with an actuator assembly having a rotatable actuator hub and a longitudinal axis, the actuator hub being subjected to a resultant force caused at least partially by a lack of complete rigidity of portions of the disk drive, the resultant force being in a direction that is substantially perpendicular to the longitudinal axis;
moving the actuator assembly by rotating the actuator hub with a positioner having (i) a magnet assembly that generates a magnetic field, and (ii) a conductor assembly that cooperates with the magnet assembly; and
partially canceling the resultant force by generating a net force with the positioner, the net force being in a direction that is substantially opposite the resultant force.

30. The method of claim 29 wherein the step of generating a net force includes generating a first force with a first coil, the first force being directed at an angle having an absolute value that is greater than zero degrees and less than approximately 45 degrees relative to the longitudinal axis of the actuator assembly.

31. The method of claim 30 wherein the step of generating a net force includes generating a second force with a spaced apart second coil, the second force being directed at an angle having an absolute value that is greater than zero degrees and less than approximately 45 degrees relative to the longitudinal axis of the actuator assembly.

32. The method of claim 31 wherein the sum of the first force and the second force equals the net force of the conductor assembly.

33. The method of claim 31 further comprising the step of independently directing electrical current to each of the coils with a control system.

34. The method of claim 31 wherein the step of generating the net force includes positioning the first coil and the second coil substantially symmetrically on either side of the longitudinal axis of the actuator assembly.

35. The method of claim 29 wherein the net force is substantially equal to and directionally opposite the resultant force.

36. A disk drive comprising:
a storage disk having a plurality of tracks;
a data transducer;
an actuator assembly that supports the data transducer over one of the tracks, the actuator assembly having a rotatable actuator hub and a longitudinal axis, the actuator hub being subjected to a resultant force caused at least partially by a lack of complete rigidity of portions of the disk drive, the resultant force urging the data transducer in an off-track direction; and
a positioner that moves the actuator assembly relative to the storage disk, the positioner including (i) a magnet assembly that generates a magnetic field, and (ii) a conductor assembly that cooperates with the magnet assembly to rotate the actuator hub, the conductor assembly including a first coil and a spaced apart second coil, the first coil generating a first force that is directed at an angle having an absolute value that is greater than zero degrees and less than approximately 45 degrees relative to the longitudinal axis, the conductor assembly generating a net force that at least partially opposes the resultant force.

37. The disk drive of claim 36 wherein the second coil generates a second force that is directed at an angle having an absolute value that is greater than zero degrees and less than approximately 45 degrees relative to the longitudinal axis.

38. The disk drive of claim 37 wherein the sum of the first force and the second force equals the net force of the conductor assembly.

39. The disk drive of claim 38 wherein the net force is substantially equal to and directionally opposite the resultant force.

40. The disk drive of claim 37 wherein the first force is directed at an angle having an absolute value that is greater than one degree and less than approximately 30 degrees relative to the longitudinal axis of the actuator assembly, arid the second force is directed at an angle having an absolute value that is greater than one degree and less than approximately 30 degrees relative to the longitudinal axis of the actuator assembly.

41. The disk drive of claim 36 wherein the first coil and the second coil are substantially symmetrical relative to the longitudinal axis of the actuator assembly.

42. The disk drive of claim 36 further comprising a control system that independently directs electrical current to each of the coils.

43. The disk drive of claim 36 wherein the first coil and the second coil are substantially coplanar.

44. The disk drive of claim 36 wherein the net force has a magnitude that is substantially equal to and directionally opposite the resultant force.

45. A method for positioning a data transducer in a disk drive, the method comprising the steps of:
   supporting the data transducer with an actuator assembly having a rotatable actuator hub and a longitudinal axis, the actuator hub being subjected to a resultant force caused at least partially by a lack of complete rigidity of portions of the disk drive, the resultant force urging the data transducer in an off-track direction;
   positioning the actuator assembly by rotating the actuator hub with a positioner that includes (i) a magnet assembly that generates a magnetic field, and (ii) a conductor assembly that cooperates with the magnet assembly;
   generating a first force with a first coil of the conductor assembly, the first force being directed at an angle having an absolute value that is greater than zero degrees and less than approximately 45 degrees relative to the longitudinal axis; and
   generating a net force with the positioner, the net force being in a direction that is substantially opposite the resultant force.

46. The method of claim 45 further comprising the step of generating a second force with a spaced apart second coil of the conductor assembly, the second force being directed at an angle having an absolute value that is greater than zero degrees and less than approximately 45 degrees relative to the longitudinal axis.

47. The method of claim 46 wherein the sum of the first force and the second force equals the net force of the conductor assembly.

48. The method of claim 46 wherein the net force is substantially equal to and directionally opposite the resultant force.

49. The method of claim 46 wherein the first force is directed at an angle having an absolute value that is greater than one degree and less than approximately 30 degrees relative to the longitudinal axis of the actuator assembly, and the second force is directed at an angle having an absolute value that is greater than one degree and less than approximately 30 degrees relative to the longitudinal axis of the actuator assembly.

50. The method of claim 46 wherein the step of positioning the actuator assembly includes positioning the coils so that the first coil and the second coil are substantially symmetrical relative to the longitudinal axis of the actuator assembly.

51. The method of claim 46 further comprising the step of independently directing electrical current to each of the coils with a control system.

52. The method of claim 45 wherein the net force has a magnitude that is substantially equal to and directionally opposite the resultant force.

* * * * *